US005453195A

United States Patent [19]
Jorgenson et al.

[11] Patent Number: 5,453,195
[45] Date of Patent: Sep. 26, 1995

[54] HIGH STRENGTH FILTER

[75] Inventors: Kenton L. Jorgenson; Melvin E. Busch; Russell D. Ridgway; Wilhelm A. A. Perleberg, all of Kearney, Nebr.

[73] Assignee: Baldwin Filters, Inc., Kearney, Nebr.

[21] Appl. No.: 137,720

[22] Filed: Oct. 18, 1993

[51] Int. Cl.⁶ ................................................. B01D 27/08
[52] U.S. Cl. .................... 210/444; 210/450; 210/DIG. 17
[58] Field of Search ................................ 210/440, 443, 210/444, 450, DIG. 17, 232

[56] References Cited

U.S. PATENT DOCUMENTS

| | | | |
|---|---|---|---|
| 3,616,933 | 11/1971 | Baldwin | 210/440 |
| 4,237,015 | 12/1980 | Fearnhead | 210/444 |
| 5,301,958 | 4/1994 | Covington | 277/183 |

OTHER PUBLICATIONS

Trade Literature and Drawing relating to Donaldson HMK–04 Spin–On Fluid Filter (circa 1991).
Technical Publication entitled "Beadlock Fastening" (circa 1991).

*Primary Examiner*—Matthew O. Savage
*Attorney, Agent, or Firm*—Leydig, Voit & Mayer

[57] ABSTRACT

The filter includes an end plate stamped and drawn from sheet metal and formed with four upright walls generally defining a square and having inlet openings therein. Relatively deep gussets are located between the walls for strengthening purposes. Located outwardly of the walls and gussets is a flat peripheral portion of relatively small area and defining a flat surface to which a sheet metal retaining ring is welded. The ring is seamed to the canister of the filter by a hem which hooks beneath a short radially extending lip of the canister.

8 Claims, 2 Drawing Sheets

HIGH STRENGTH FILTER

BACKGROUND OF THE INVENTION

This invention relates to a filter for liquids such as lubricating oil, hydraulic oil and the like.

More particularly, the invention relates to a so-called spin-on filter of the type having a deep drawn sheet metal canister, a filter element within the canister, an end plate for holding the filter element in the canister, and a retaining ring for attaching the end plate to the canister. In addition to holding the filter element in the canister, the end plate provides a flow path to and from the filter element and includes means enabling the filter to be screwed onto a mounting adaptor. A filter of this general type is disclosed in Fearnhead U.S. Pat. No. 4,237,015. In the Fearnhead filter, the retaining ring is joined to the upper end of the canister by a conventional double seamed construction and coacts with the canister and the end plate to define an annular space for a preformed sealing gasket which is placed in compression during the seaming operation.

The filter of the present invention is a high strength filter which is particularly adapted for use in high pressure applications, for example, in hydrostatic transmissions. In such applications, the filter must be capable of withstanding pressure spikes in excess of 1,000 p.s.i. without bursting and must be capable of withstanding continuous cyclic pressure surges of up to 500 p.s.i. for sustained periods without fatigue failure and resulting leakage. Conventional double seamed filters fail in fatigue under high cyclic pressures due to residual stresses resulting from the seaming operation and from a hinging action between the canister and the retaining ring.

High performance filters require a large outlet port in the center of the end plate and, as a result, only a relatively small end plate area remains outboard of the outlet port, that area being perforated to form inlet ports to the filter element. In conventional filters with end plates stamped from sheet metal, the formation of the inlet ports in the relatively small available area of the end plate weakens the end plate to such an extent that it cannot withstand high pressures. As a result, prior art high strength and high performance filters generally have resorted to the use of die cast aluminum end plates. Such end plates require high initial tooling costs, high costs for maintaining the tooling, relatively long manufacturing cycle rates and significant secondary machining. In addition, a specially designed shell is required to effect fastening of a die cast end plate to the shell.

SUMMARY OF THE INVENTION

The general aim of the present invention is to provide a new and improved high strength filter which, when compared to prior filters of the same general type, is of relatively simple and inexpensive construction.

A related object of the invention is to provide a high strength filter whose components may be made and assembled with the same general techniques available in making and assembling conventional lower strength filters.

A more detailed object is to achieve the foregoing in part through the provision of a low cost stamped metal end plate which is uniquely constructed to withstand deflection when subjected to high pressure.

A related and still more specific object is to provide a stamped metal end plate having a flat peripheral portion for attachment to the retaining ring, generally vertical walls for accommodating the inlet ports, and relative deep gussets for preventing deflection of the end plate.

The invention also resides in the provision of a unique seam enabling the joining of a thin-walled retainer to a thicker-walled canister in a manner providing a high strength and fatigue-resistant connection between the two components.

These and other objects and advantages of the invention will become more apparent from the following detailed description when taken in conjunction with the accompanying drawings.

Figure 1:
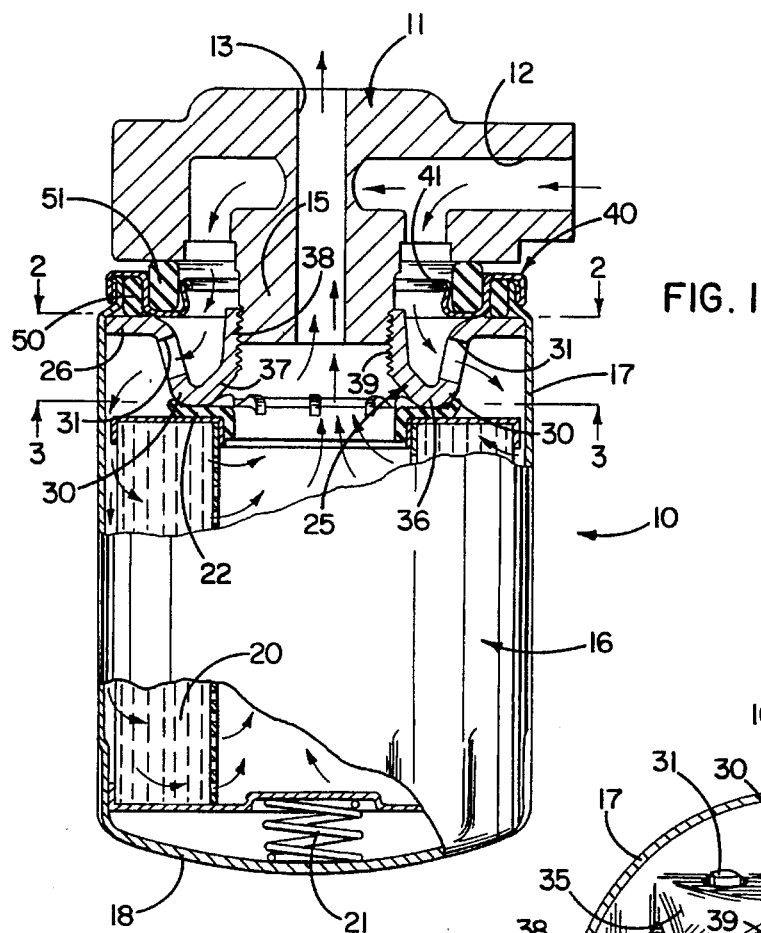
FIG. 1 is a cross-sectional view taken axially through a new and improved filter incorporating the unique features of the present invention and shows the filter attached to a typical mounting adaptor.
Figure 2:
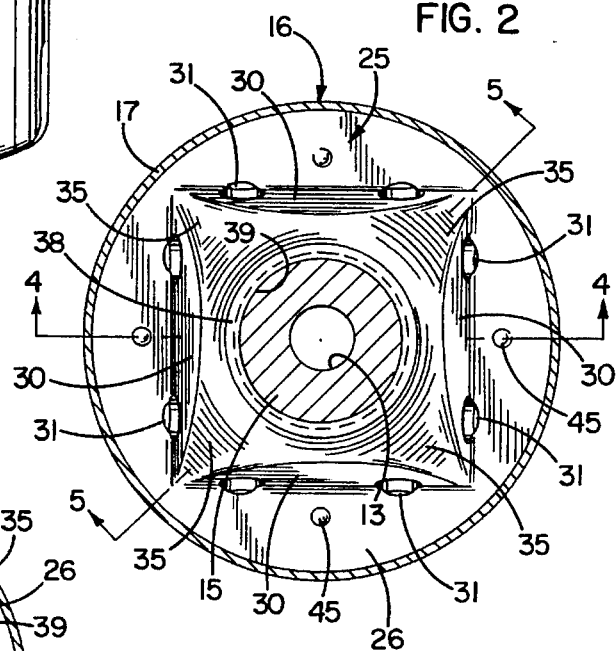
FIGS. 2 and 3 are cross-sections taken substantially along the lines 2—2 and 3—3, respectively, of FIG. 1.
Figure 3:
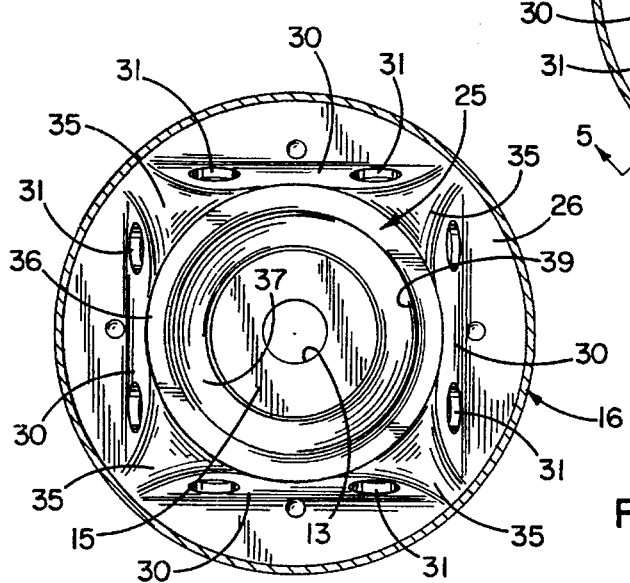
Figure 4:
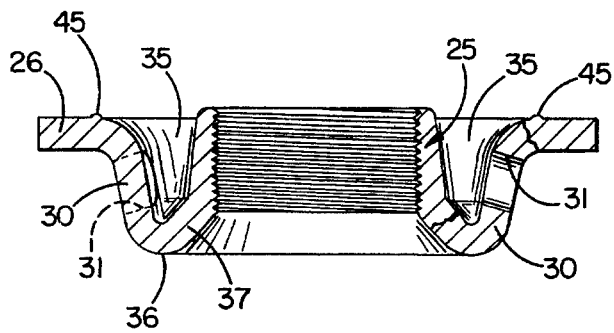
FIGS. 4 and 5 are cross-sections taken substantially along the lines 4—4 and 5—5, respectively, of FIG. 2.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as embodied in a filter 10 for use, for example, in filtering the hydraulic oil used in a hydrostatic transmission (not shown) having a mounting adaptor 11. The adaptor includes an inlet 12 for dirty oil and an outlet 13 for filtered oil. The outlet is formed in an externally threaded neck 15 by which the filter 10 is attached to the adaptor 11.

Figure 6:
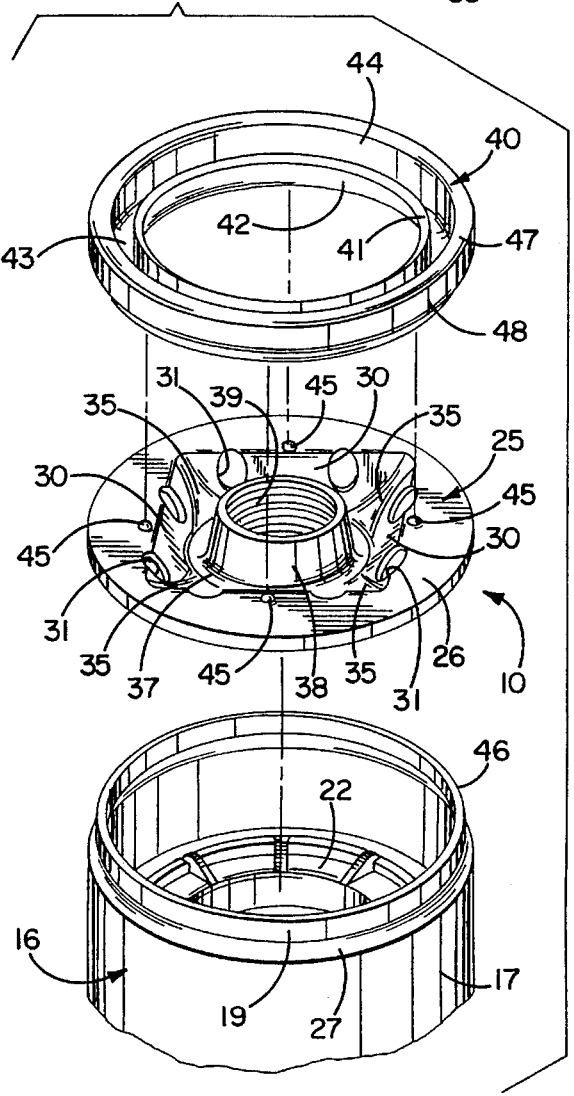
FIG. 6 is an exploded perspective view of the canister, the end plate and the retaining ring.
Figure 7:
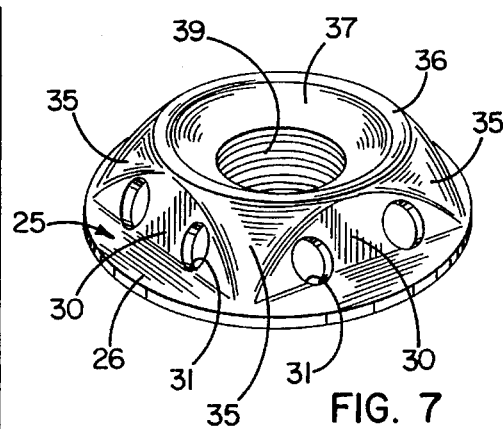
FIG. 7 is a perspective view showing the bottom of the end plate.

The filter 10 includes a deep drawn canister 16 made of relatively heavy gauge sheet steel and having a cylindrical side wall 17 and a domed end wall 18 integral with the lower end of the side wall. The extreme upper end portion of the canister is formed with a short neck section 19 (FIGS. 6 and 7) which is smaller in diameter than the primary side wall 17.

Disposed within the canister 16 is a tubular filter element 20 which is urged upwardly by a coil spring 21 compressed between the end wall 18 and the lower end of the filter element. A resilient sealing gasket 22 on the upper end of the filter element helps isolate the exterior of the filter element from the interior thereof in a manner to be explained more fully below.

Oil from the inlet 12 of the adaptor 11 flows into the canister 16 and downwardly alongside the outer side of the filter element 20. The oil is cleaned upon flowing radially inwardly through the filter element and then flows upwardly out of the interior of the filter element to the outlet 13 of the adaptor.

The filter 10 of the invention is especially adapted for use in high pressure applications and thus must be of high strength. In accordance with one aspect of the present invention, high strength is imparted to the filter by an end plate 25 which may be economically blanked and drawn from sheet steel but which is sufficiently strong to withstand high pressures without significant deflection.

More specifically, the end plate 25 is generally in the form of a substantially cylindrical member which is stamped and drawn from steel having a thickness significantly greater than that of the canister 16. For a purpose to be explained subsequently, the outer peripheral portion 26 of the end plate is flat and planar and generally defines a disc. The outer peripheral portion 26 of the end plate is disposed in a radial plane and its outer edge extends to the inner side of the side wall 17 of the canister 16 at the junction 27 between the side wall and the reduced diameter neck 19 (see FIG. 8).

In carrying out the invention, substantially vertical and angularly spaced walls 30 are formed integrally with and depend from the inner margin of the flat peripheral portion 26 of the end plate 25. Herein, there are four such walls 30 and they are positioned so as to generally define a square. Thus, two of the walls extend generally parallel to one another while the other two walls also generally parallel one another and extend substantially perpendicular to the first two walls. The walls are substantially flat, extend chordwise of the plate 25, and terminate short of the flat and planar peripheral portion 26 of the plate. While the walls are generally vertical, they do incline downwardly and inwardly at a small angle (e.g., 10 degrees) relative to vertical.

Two holes 31 are formed through and are spaced chordwise along each wall 30 and extend substantially perpendicular thereto. The holes define inlet ports enabling oil to flow from the inlet 12 of the adaptor 11 and into the canister 16 along the outer side of the filter element 20.

Figure 5:
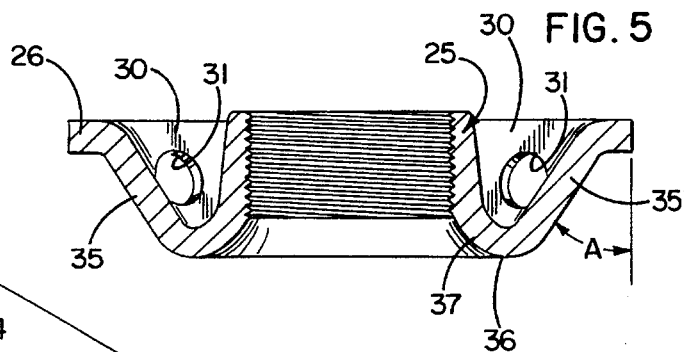

Further in keeping with the invention, four strengthening gussets 35 are formed integrally with and depend from the inner margin of the flat peripheral portion 26 of the end plate 25. A gusset is located between adjacent ends of adjacent walls 30, each gusset and becoming progressively wider in a circumferential direction upon proceeding downwardly from the planar portion 26 of the plate 25 (see FIG. 7). Thus, each gusset conforms generally in shape to the shape of a portion of a frustum. Each gusset is inclined relative to vertical at a substantial angle A such as 35 degrees (FIG. 5). The gussets are generally triangular in shape and blend gradually with one another and with the walls 30 near the lower end of the plate so as to define a narrow and continuous circular annulus 36 at the lower end of the plate.

A relatively short and generally frustoconical annular flange 37 (FIGS. 5 and 7) is integral with the annulus 36 and projects upwardly therefrom, the flange tapering inwardly upon progressing upwardly. Formed integrally with the upper margin of the flange is a sleeve 38 having a cylindrical bore which is threaded as indicated at 39. The threaded sleeve 38 is adapted to screw onto the threaded neck 15 of the adaptor 11 in order to attach the filter 10 to the adaptor.

In order to attach the end plate 25 to the canister 16, provision is made of a retaining ring 40 (FIGS. 6 and 8) which is formed of sheet metal, the sheet metal of the ring being of substantially lighter gauge, and thus being thinner, than the sheet metal of the canister. The ring includes an annular inner lip 41 of substantial diameter disposed in widely spaced encircling relation with the neck 15 of the adaptor 11 and defining a relatively large opening through which oil from the inlet 12 of the adaptor may flow to the inlet ports 31 of the end plate 25. Located outwardly of the lip 41 is an upwardly opening and generally U-shaped channel defined by an upright wall 42 (FIG. 8) extending downwardly from the lip, a flat and generally horizontal wall 43 extending radially outwardly from the wall 42, and a vertical wall 44 extending upwardly from the wall 43. The flat horizontal wall 43 of the ring 40 seats against the flat upper surface of the peripheral portion 26 of the end plate 25 and is projection welded thereto. For this purpose, four angularly spaced and upwardly extending bosses 45 (FIGS. 6 and 8) are formed on the peripheral portion 26 of the end plate 25 and become fused to the bottom wall 43 of the ring 40 when the components are subjected to a projection welding operation. The flat upper surface provided by the peripheral portion 26 of the end plate mates face-to-face against the flat bottom wall 43 of the ring 40 to enable a high strength weld to be achieved.

Pursuant to the invention, the retaining ring 40 is joined to the canister 16 by means which enable the thin ring to be seamed to the thicker canister without static failure or so-called "unroll" of the seam and with reduced danger of impulse pressure failure due to hinging and cracking of the ring. To this end, the upper end of the reduced diameter neck 19 of the canister is formed with a short radially outwardly projecting lip 46 (FIG. 8) which terminates in a radially outwardly facing free edge. The ring 40 includes a generally radially projecting section 47 integral with the upper end of the wall 44 and extending outwardly across the upper side of the lip 46. A generally vertical section 48 of the ring 40 is formed integrally with the radial section 47 and extends downwardly past the outer free edge of the lip 46 to a point adjacent the lower end of the neck 19. An upwardly projecting section 49 is formed integrally with and extends upwardly from the section 48 and includes an upper edge which engages the lower side of the lip 46. The upwardly projecting section 49 is located in adjacent face-to=face relation with generally vertical section 48 throughout the entire vertical length of the upwardly projecting section 49. The inner side of the section 49 engages the outer side of the neck 19. The sections 48 and 49 coact to define a hem at the outer periphery of the ring 40.

The filter 10 is completed by two preformed annular gaskets 50 and 51 (FIG. 8) made of elastomeric material. The gasket 50 is contained within a chamber defined by the upper surface of the peripheral portion 26 of the end plate 25, by the vertical wall 44 and the radially extending section 47 of the retaining ring 40, and by the inner side of the neck 19 of the canister 16. When the components of the filter 10 are assembled, the gasket 50 establishes a seal preventing inlet oil from leaking past the seam between the canister 16 and the ring 40. The gasket 51 is seated in the channel defined by the walls 42, 43 and 44 and seals in a conventional manner against the adaptor 11 when the sleeve 38 of the filter 10 is screwed onto the neck 15 of the adaptor.

The components of the filter 10 are assembled by placing the spring 21 and the filter element 20 with the sealing gasket 22 attached thereto into the canister 16, the side wall 17 of the canister initially being of uniform diameter and not having the reduced diameter neck 19 but having the upper lip 46. The gasket 50 is placed between the upper surface of the peripheral portion 26 of the end plate 25 and the lower surface of the radially projecting section 47 of the retaining ring 40, the sections 48 and 49 of the ring initially lying in the same radial plane as the section 47. The end plate and the retaining ring then are fastened securely together by projection welding. Upon completion of the welding operation, the gasket 50 is located radially by the wall 42 of the ring but is not in a state of compression.

The subassembly consisting of the end plate 25, the retaining ring 40 and the gasket 50 then is placed in the canister 16 until the lower annulus 36 of the end plate rests on the gasket 22 of the filter element 20. Thereafter, the upper end portion of the canister is rolled inwardly to form the neck 19 and thereby clamp the annulus 36 of the end plate downwardly against the gasket 22 of the filter element 20. The spring 21 acting on the filter element urges the gasket 22 upwardly into sealing relation with the annulus 36 and also urges the outer margin of the peripheral portion 26 of the end plate 45 upwardly into engagement with the radiused junction 27 between the canister wall 17 and neck 19. Sealing of the gasket 22 against the annulus 36 prevents unfiltered oil at the inlet ports 31 and the outside of the filter element 20 from mixing with filtered oil in the interior of the filter element and the outlet sleeve 37.

Figure 8:
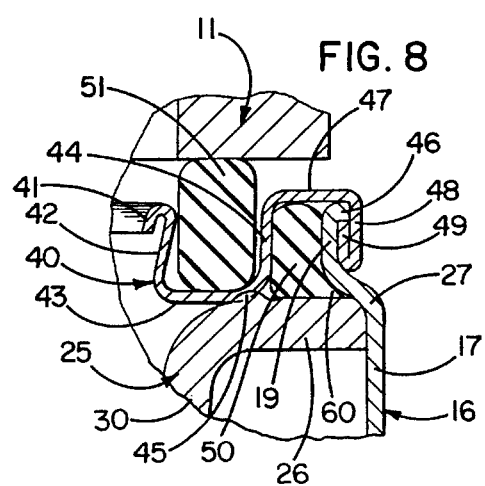
FIG. 8 is an enlarged cross-sectional view primarily showing the seam between the canister and the retaining ring.

Assembly of the filter 10 is substantially completed by rolling the sections 48 and 49 of the ring 40 into the configuration shown in FIG. 8 with a seamer. Thus, the section 48 is folded downwardly from the section 47 while the section 49 is folded upwardly from the section 48 and into engagement with the outer side of the neck 44 and the underside of the lip 46. As an incident thereto, the gasket 50 is placed in compression, causing a radially extending fin 60 to extrude outwardly into the space between the upper side of the peripheral portion 26 of the end plate 45 and the lower end of the neck 19. Once the gasket 51 has been installed, the filter 10 is ready for spin-on attachment to the adaptor 11.

By virtue of its configuration, the end plate 45—even though economically stamped and drawn from sheet steel—has sufficient strength to withstand high pressures developed in the canister 16 without deflecting and failing or causing leakage. The flat and substantially vertical walls 30 of the end plate are placed substantially in direct compression between the gasket 22 and the canister junction 27 while the deep dished gussets 35 extend nearly to the inside diameter of the canister 16 and impart sectional strength to the end plate so that weakening of the walls 30 by the inlet ports 31 has little effect on the overall strength of the end plate. The end plate advantageously includes the flat peripheral portion 26 defining a welding surface for the retaining ring 40 but, due to the configuration of the walls 30 and the gussets 35, the flat peripheral section is of relatively small area and thus is not subject to significant deflection. As a result of its shape, the stamped steel end plate is as strong or stronger than comparable die cast plates.

By virtue of the lip 46, the canister 16 may be made of heavy gauge metal to withstand high pressure and yet the retaining ring 40 may be made of relatively thin metal and seamed to the canister to save cost and to reduce the power required during the seaming operation. The heavy walled lip 46 serves as the sole load bearing joint between the canister and the ring and prevents the canister from becoming wavy in the area of the gasket 50. The lip also helps prevent hinging and fatigue of the ring.

In certain ones of the appended claims, terms such as "upper" and "lower" and like terms indicating vertical direction or orientation have been used merely for purposes of conciseness and simplicity in understanding. It will be appreciated, however, that the filter 10 may be oriented in positions other than the upwardly facing vertical orientation shown in the drawings and that the claims are to be construed in that spirit.

We claim:

1. A spin-on filter cartridge comprising a sheet metal canister of circular cross-section and having an open upper end and a closed lower end, a filter element located in said canister, an end plate located in said canister adjacent the upper end thereof, said end plate comprising a generally circular member made of sheet metal and having a peripheral portion with a generally flat and upwardly facing surface and with an inner margin, a plurality of equally spaced and generally flat upright walls formed integrally with and depending from the inner margin of said peripheral portion, said walls extending generally chordwise of said member and each having at least one inlet port formed therethrough, a plurality of equally spaced gussets formed integrally with and depending from the inner margin of said peripheral portion and having lower margins, said gussets being integral with and located between adjacent ends of adjacent walls, each gusset becoming progressively wider in a circumferential direction as the gusset progresses downwardly, a generally frustoconical annular flange integral with and extending around the lower margins of said gussets, said flange projecting upwardly from the lower margins of said gussets and tapering inwardly upon progressing upwardly, an internally threaded sleeve integral with and projecting upwardly from the upper end of said flange, said sleeve defining an outlet for said cartridge and permitting installation of said cartridge with a spin-on motion, and means for attaching said end plate to said canister adjacent the upper end thereof.

2. A filter cartridge as defined in claim 1 in which there are four of said walls, a first pair of said walls extending generally parallel to one another, the second pair of walls also extending generally parallel to one another and generally perpendicular to the walls of said first pair.

3. A filter cartridge as defined in claim 1 in which said means comprise an annular sheet metal retainer having a lower surface welded to said flat upwardly facing surface of said peripheral portion of said end plate and having a peripheral portion joined to said canister adjacent the upper end thereof.

4. A filter cartridge as defined in claim 3 in which said canister includes an upper end portion defined by a wall having a lower section of predetermined diameter and an integral upper section of smaller diameter than said lower section, said upper section having an upper end and an inner side, a retaining lip formed integrally with and projecting radially outwardly from the upper end of said upper section and having a lower side and a radially facing outer free edge, the peripheral portion of said annular retainer having a generally radially projecting section extending outwardly across the top of said lip, having a generally vertical section integral with said radially projecting section and extending downwardly past the outer free edge of said lip, and having an upwardly projecting section integral with said vertical section, said upwardly projecting section being located in engagement with the smaller diameter upper section of said canister and having an upper edge engaging the lower side of said lip.

5. A filter cartridge as defined in claim 4 in which said retainer includes a downwardly extending wall integral with and depending from an inner margin of said radially projecting section, an annular chamber defined by said downwardly extending wall, by said radially projecting section, by an inner side of said integral upper section of said canister and by said upwardly facing surface of said end plate, and a preformed annular seal located within said chamber to establish a seal between said canister and said retainer.

6. A spin-on filter cartridge comprising a sheet metal canister of circular cross-section and having open and closed ends, a filter element located in said canister, an end plate located in said canister adjacent the open end thereof, said end plate comprising a generally circular member made of sheet metal and having a peripheral portion with a generally flat surface located proximate to the open end of the canister and facing axially away from the closed end of the canister, said peripheral portion having an inner margin, a plurality of equally spaced and generally flat walls formed integrally with the inner margin of said peripheral portion and extending into said canister toward the closed end thereof, said walls extending generally chordwise of said member and each having at least one inlet port formed therethrough, a plurality of angularly spaced gussets formed integrally with the inner margin of said peripheral portion and extending into said canister toward the closed end thereof, said gussets being integral with and located between adjacent ends of adjacent walls, each gusset becoming progressively wider in a circumferential direction as such gusset progresses toward the closed end of said canister, an internally threaded sleeve integral with and located inwardly of said walls and said gussets and projecting away from the closed end of said canister, said sleeve defining an outlet for said cartridge and permitting installation of said cartridge with a spin-on motion, and means for attaching said end plate to said canister adjacent the open end thereof.

7. A filter cartridge comprising a sheet metal canister of circular cross-section and having an open upper end and a closed lower end, a filter element located in said canister, said canister having an upper end portion with-a lower section of predetermined diameter and an upper section of smaller diameter than said lower section, said upper section having an upper end and an inner side, a retaining lip formed integrally with and projecting radially outwardly from the upper end of said upper section, said retaining lip having radially extending upper and lower sides and having a radially facing outer free edge extending axially between said upper and lower sides, a sheet metal end plate located within said lower section of said upper end portion and having flow ports, an annular sheet metal retainer fastened to said end plate and having an outer peripheral portion, the peripheral portion of said retainer having (i) a generally radially projecting section extending outwardly across the top of said lip, (ii) a generally vertical section integral with said radially projecting section and extending downwardly past the outer free edge of said lip, and (iii) an upwardly projecting section integral with said vertical section and located in adjacent face-to-face relation with said vertical section throughout the entire vertical length of said upwardly projecting section, said upwardly projecting section being located in engagement with the smaller diameter upper section of said canister and having an upper edge engaging the lower side of said lip below the radially outwardly facing free edge of the lip.

8. A filter cartridge as defined in claim 7 in which said radially projecting section includes an inner margin, said retainer including a downwardly extending section integral with and depending from the inner margin of said radially projecting section, an annular chamber defined by said downwardly extending section, by said radially projecting section, by the inner side of said smaller diameter upper section of said canister and by said upwardly facing surface of said end plate, and an annular seal located within said chamber to establish a seal between said canister and said retainer.

* * * * *